(12) United States Patent
Cerrano

(10) Patent No.: US 11,001,195 B2
(45) Date of Patent: May 11, 2021

(54) ADVANCE LIGHTING SYSTEM FOR USE WITH EMERGENCY VEHICLES

(71) Applicant: Hale Products, Inc., Ocala, FL (US)

(72) Inventor: Jason Cerrano, Wentzville, MO (US)

(73) Assignee: Hale Products, Inc., Ocala, FL (US)

( * ) Notice: Subject to any disclaimer, the term of this patent is extended or adjusted under 35 U.S.C. 154(b) by 0 days.

(21) Appl. No.: 16/544,344

(22) Filed: Aug. 19, 2019

(65) Prior Publication Data

US 2019/0366911 A1 Dec. 5, 2019

Related U.S. Application Data

(63) Continuation of application No. 13/859,443, filed on Apr. 9, 2013, now Pat. No. 10,384,594.

(60) Provisional application No. 61/621,822, filed on Apr. 9, 2012.

(51) Int. Cl.
*B60Q 1/24* (2006.01)
*F21V 21/14* (2006.01)

(52) U.S. Cl.
CPC ............... *B60Q 1/24* (2013.01); *B60Q 1/245* (2013.01); *F21V 21/14* (2013.01)

(58) Field of Classification Search
CPC ............ B60Q 1/24; B60Q 1/245; F21V 21/14
See application file for complete search history.

(56) References Cited

U.S. PATENT DOCUMENTS

| | | | |
|---|---|---|---|
| 3,434,108 A | 3/1969 | Dawson | |
| 5,166,663 A * | 11/1992 | Leis | B60Q 1/50 116/39 |
| 5,481,441 A * | 1/1996 | Stevens | B60Q 1/24 362/232 |
| 5,769,527 A * | 6/1998 | Taylor | H05B 47/12 362/85 |
| 5,931,573 A | 8/1999 | Knox | |
| 6,293,686 B1 | 9/2001 | Hayami et al. | |
| 7,175,320 B1 | 2/2007 | Burgess | |
| 8,004,394 B2 | 8/2011 | Englander | |
| 8,182,125 B2 | 5/2012 | Englander | |
| 8,669,853 B1 | 3/2014 | Gardner | |
| 9,150,147 B2 | 10/2015 | Brush | |
| 2004/0100803 A1* | 5/2004 | Steward | B60Q 1/05 362/505 |
| 2004/0143380 A1 | 7/2004 | Stam | |
| 2004/0263647 A1 | 12/2004 | Yamaguchi | |
| 2007/0080645 A1 | 4/2007 | Smith | |
| 2009/0201689 A1* | 8/2009 | Nolle | B60Q 1/24 362/485 |
| 2012/0098655 A1 | 4/2012 | Preta | |
| 2012/0300487 A1* | 11/2012 | Jonker | B60Q 1/24 362/526 |
| 2012/0320613 A1* | 12/2012 | Singhal | B60Q 1/245 362/487 |

FOREIGN PATENT DOCUMENTS

WO 2014114439 A1 7/2014

* cited by examiner

*Primary Examiner* — Sharon E Payne

(74) *Attorney, Agent, or Firm* — Armstrong Teasdale LLP

(57) ABSTRACT

A lighting system includes a plurality of lights, and a control mechanism configured to automatically adjust at least a first light of the plurality of lights based on one of a desired position and a desired direction. Each light of the plurality of lights is adjustable to project a light beam.

20 Claims, 7 Drawing Sheets

ADVANCE LIGHTING SYSTEM FOR USE WITH EMERGENCY VEHICLES

CROSS REFERENCE TO RELATED APPLICATIONS

This application is a continuation of U.S. patent application Ser. No. 13/859,443, filed Apr. 9, 2013, which claims priority to U.S. Provisional Patent Application No. 61/621,822 filed Apr. 9, 2012, the disclosures of which are hereby incorporated by reference in their entirety.

BACKGROUND

At least some known emergency vehicles include scene-lighting systems that enable emergency crews to operate in low light conditions. For example, in FIG. 1, a known emergency vehicle 100 includes a known lighting system 110. Lighting system 110 includes at least one body-mounted light 120, and at least one light tower 130 that includes a plurality of tower lights 140. In use, body-mounted light 120 and tower lights 140 project light beams 150 and 160, respectively, outward from emergency vehicle 100.

Body-mounted light 120, light tower 130, and tower lights 140 are manually adjustable to direct light beams 150 and 160, respectively, in a desired area. However, body-mounted lights 120 are not adjustable, and neither body-mounted lights 120 nor tower lights 140 are automatically deployable. Accordingly, the deployment and/or operation of lights 120 and/or 140 require an operator to be generally near vehicle 100 for at least some known lighting systems. Such requirements may be time consuming and/or could potentially distract the operator from other tasks related to the emergency.

BRIEF SUMMARY

In one aspect, a method is provided for adjusting a lighting system for use with a vehicle. The method includes identifying a desired position and/or a desired direction, and automatically adjusting at least a first light of a plurality of lights based on the desired position and/or the desired direction. Each light of the plurality of lights is adjustable to project a light beam.

In another aspect, a lighting system is provided. The lighting system includes a plurality of lights, and a control mechanism configured to automatically adjust at least a first light of the plurality of lights based on one of a desired position and a desired direction. Each light of the plurality of lights is adjustable to project a light beam.

In yet another aspect, a vehicle is provided. The vehicle includes a body, a plurality of lights positioned adjacent the body, and a control mechanism configured to automatically adjust at least a first light of the plurality of lights based on one of a desired position and a desired direction. Each light of the plurality of lights is adjustable to project a light beam.

The features, functions, and advantages described herein may be achieved independently in various embodiments of the present disclosure or may be combined in yet other embodiments, further details of which may be seen with reference to the following description and drawings.

DETAILED DESCRIPTION OF THE INVENTION

The methods and apparatus described herein relate to lighting systems and, more particularly, to lighting systems for use with emergency vehicles. The lighting systems described herein facilitate reducing time associated with deploying a lighting system. In one embodiment, the lighting system includes at least a light, a sensor, and a computing system coupled to the light and/or to the sensor. Each light is selectively adjusted based on sensor data and/or user input to automatically project light in a desired direction.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The features, functions, and advantages described herein may be achieved independently in various embodiments of the present disclosure or may be combined in yet other embodiments, further details of which may be seen with reference to the following description and drawings.

Figure 1:
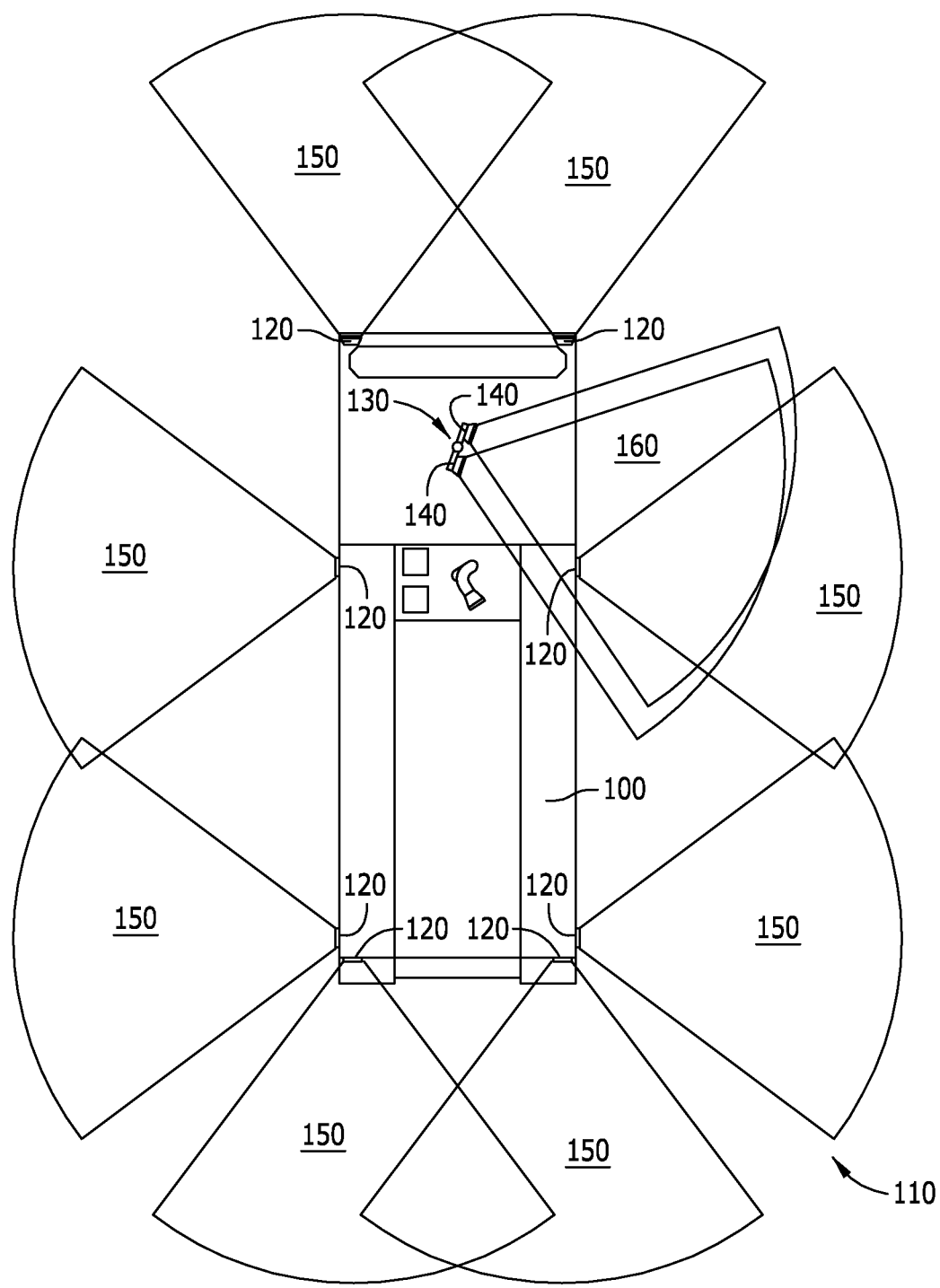
FIG. 1 is a top view of a known vehicle including a known lighting system.
Figure 2:
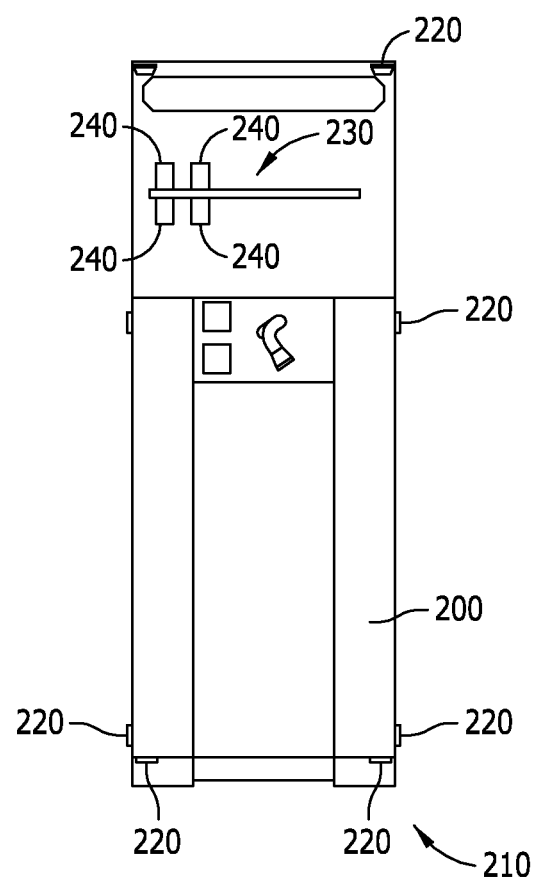
FIG. 2 is a top view of an exemplary vehicle.
Figure 3:
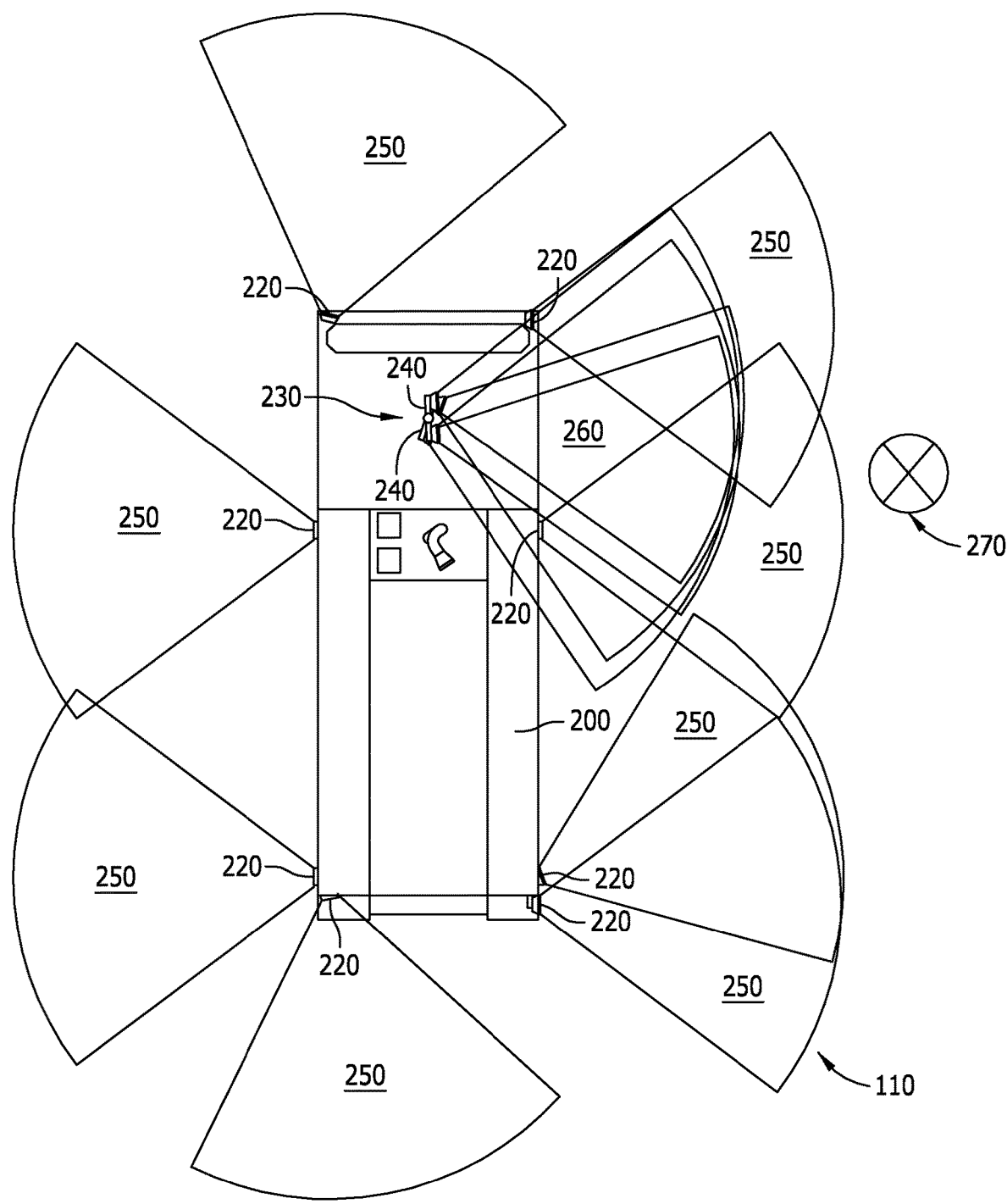
FIG. 3 is a top view of an exemplary lighting system that may be used with the vehicle shown in FIG. 2.

FIGS. 2 and 3 are top views of an exemplary vehicle 200. In the exemplary embodiment, vehicle 200 is a fire truck. Alternatively, vehicle 200 may be any vessel, aircraft, and/or vehicle including, without limitation, a boat, a helicopter, an ambulance, a police car, and/or an all-terrain vehicle. In the exemplary embodiment, vehicle 200 includes a lighting system 210. In the exemplary embodiment, lighting system 210 includes at least one first light (e.g., body-mounted light) 220 directly coupled to a body of vehicle 200, and at least one tower assembly including a light tower 230 coupled to the body, and at least one second light (e.g., tower light) 240 coupled to light tower 230. Lighting system 210 may include any number of body-mounted lights 220, light towers 230, and/or tower lights 240 that enable lighting system 210 to function as described herein. In the exemplary embodiment, body-mounted light 220 and tower lights 240 are configured to project light beams 250 and 260 (shown in FIG. 3), respectively. In the exemplary embodiment, each light beam 250 and 260 has a beam spread that is adjustable between a narrow beam spread and a wide beam spread.

In the exemplary embodiment, each body-mounted light 220 and/or tower light 240 is independently adjustable and/or movable to project and/or direct a respective light beam 250 and/or 260 towards a desired area. In at least some embodiments, body-mounted light 220 includes a pole (not shown) and/or actuator (not shown) directly coupled to the body that enables the at least one body-mounted light 220 to be independently rotated and/or adjusted towards a desired area. In at least some embodiments, the pole has a telescopic configuration that enables a height/length of the pole to be selectively adjusted to a desired height/length.

Figure 4:
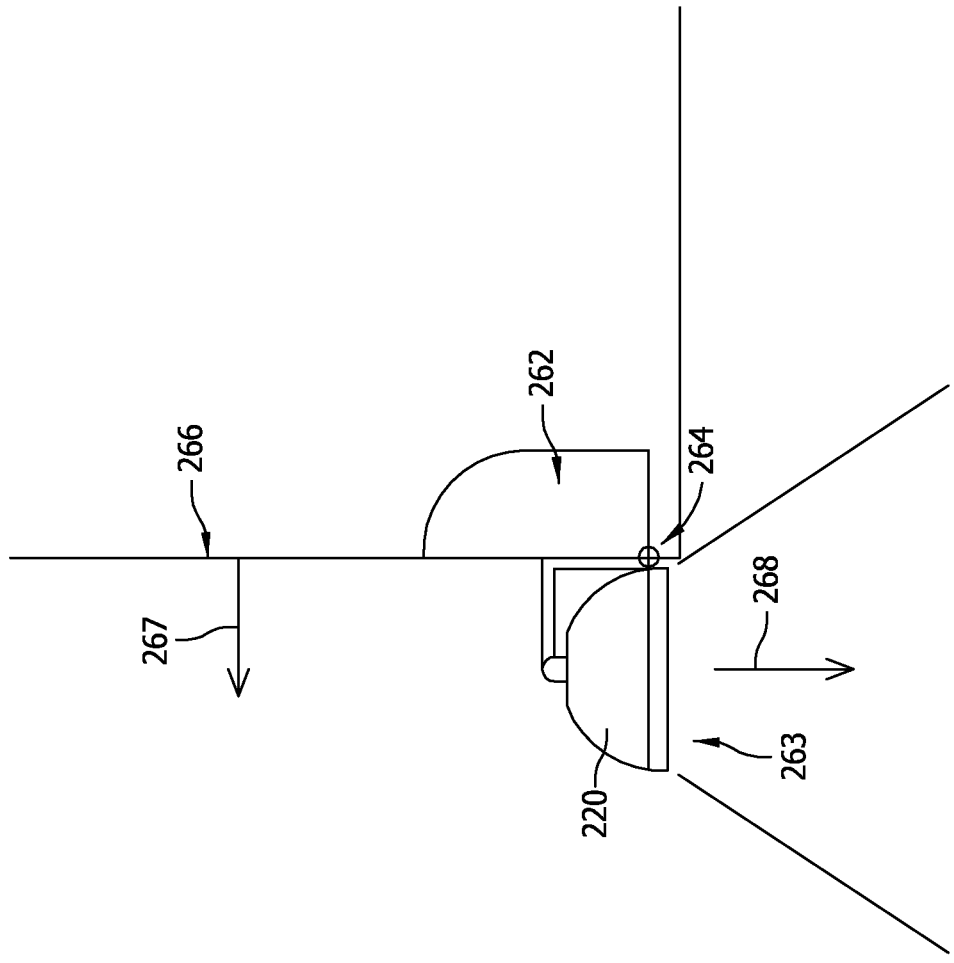
FIG. 4 is a schematic illustration of an exemplary body-mounted light that may be used with the lighting system shown in FIG. 3.
Figure 4:
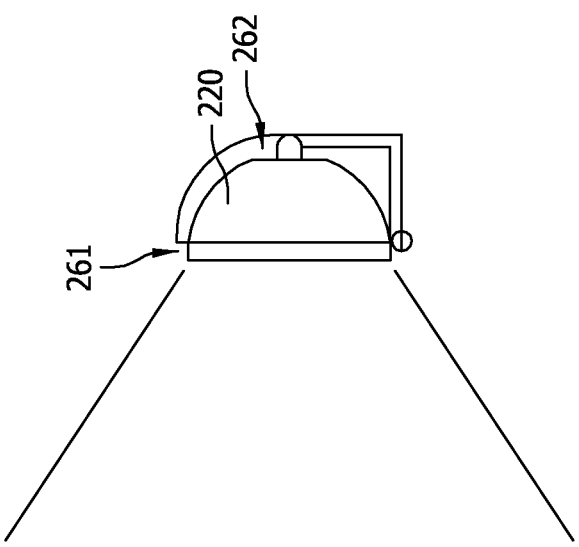
Figure 5:
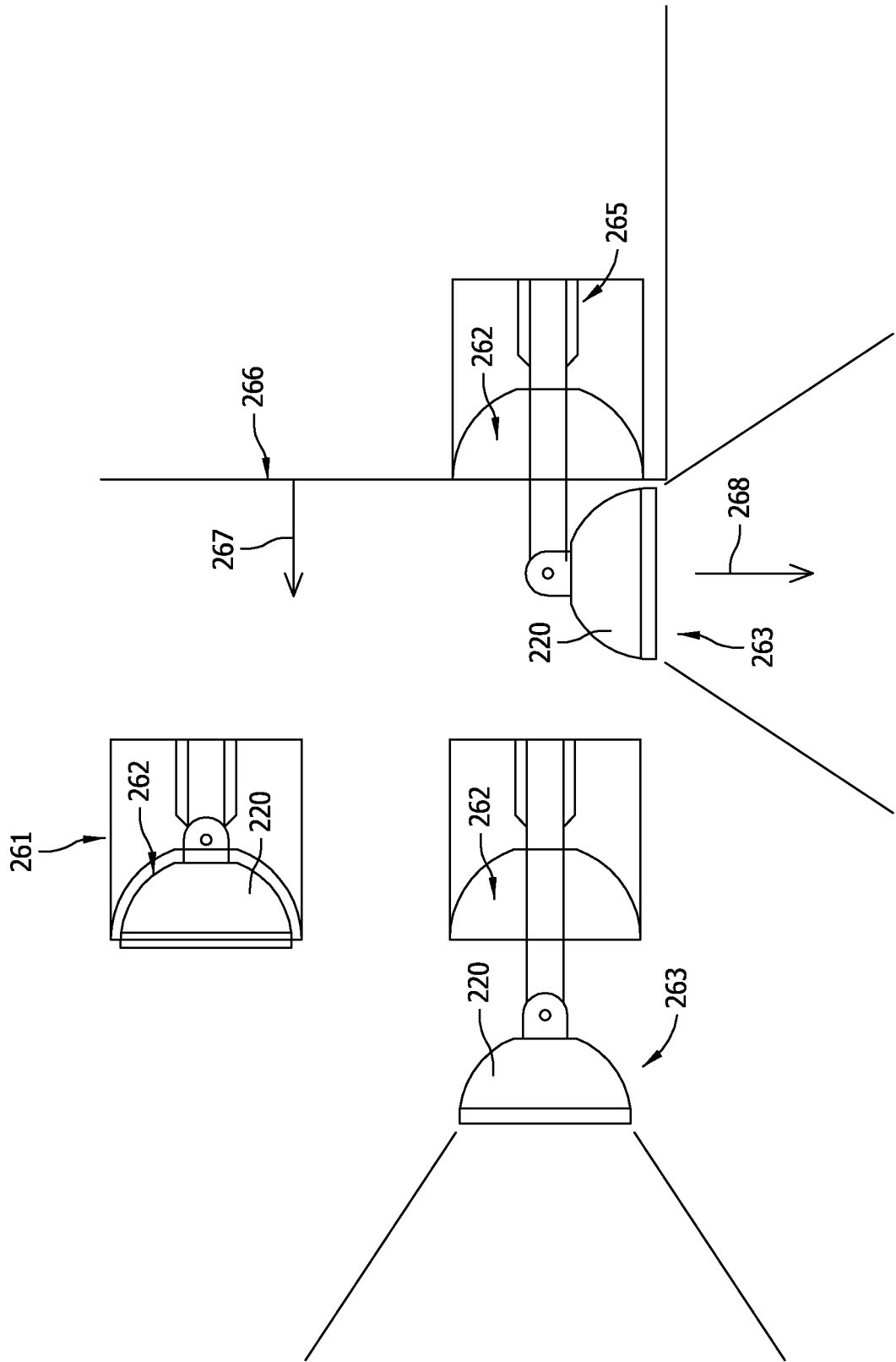
FIG. 5 is a schematic illustration of another exemplary body-mounted light that may be used with the lighting system shown in FIG. 3.

FIG. 4 is a schematic illustration of a hinged-mount version of body-mounted light 220. FIG. 5 is a schematic illustration of a flush-mount version of body-mounted light 220. In at least some embodiments, body-mounted light 220 is movable between a stowed position 261 within a cavity 262 at least partially defined by the vehicle body and a deployed position 263 out from cavity 262 to adjust body-mounted light 220 towards a desired position and/or direction. For example, in one implementation, FIG. 4 shows body-mounted light 220 horizontally rotatable about a vertical axis between stowed position 261 and deployed position 263 about a hinge 264. In another implementation, FIG. 5 shows body-mount light 220 translatable between stowed position 261 and deployed position 263 relative to a base 265.

In some embodiments, body-mounted light 220 is coupled to a first side 266 of vehicle 200 (e.g., a rear of the fire truck) oriented to face a first direction 267 (e.g., backwards from the fire truck) and is positionable such that light beam 250 is projected in a second direction 268 that is different from first direction 267. In the deployed position, body-mounted light 220 is rotatable and/or adjustable in any direction towards a desired area. For example, in one implementation, body-mounted light 220 is rotated such that light beam 250 is projected substantially perpendicular to first direction 267 (e.g., light beam 250 is projected to the right of the fire truck). Body-mounted light 220 may be adjustable in any direction and/or have any configuration that enables lighting system 210 to function as described herein. In at least some embodiments, lighting system 210 includes a plurality of sensors (not shown) that enable body-mounted light 220 to be automatically adjusted.

In the exemplary embodiment, light tower 230 is automatically movable between a stowed position (shown in FIG. 2) and a deployed position (shown in FIG. 3). In at least some embodiments, lighting system 210 includes a plurality of sensors (not shown) that enable light tower 230 and/or tower lights 240 to be automatically adjusted.

In the exemplary embodiment, at least one sensor is configured and/or oriented to detect whether an object and/or obstacle is positioned in a path (not shown) of light tower 230 between the stowed position and the deployed position. In such an embodiment, a control mechanism (in FIG. 7) is configured to determine whether light tower 230 is free and/or clear to move between the stowed position and the deployed position. That is, in such an embodiment, the sensor may be used to determine whether light tower 230 may be safely deployed without hitting the obstacle.

In the deployed position of the exemplary embodiment, light tower 230 is rotatable about a vertical axis (not shown) to direct light beams 260 towards a desired area. In at least some embodiments, light tower 230 includes a system of poles and/or actuators (not shown) that are coupled to tower lights 240 to enable each tower light 240 to be independently adjusted and/or rotated in any direction towards a desired area. Additionally or alternatively, each tower light 240 is independently adjustable and/or rotatable in any direction about light tower 230. In at least some embodiments, at least some poles have a telescopic configuration that enables a length of the respective pole to be selectively adjusted to a desired length.

Figure 6:
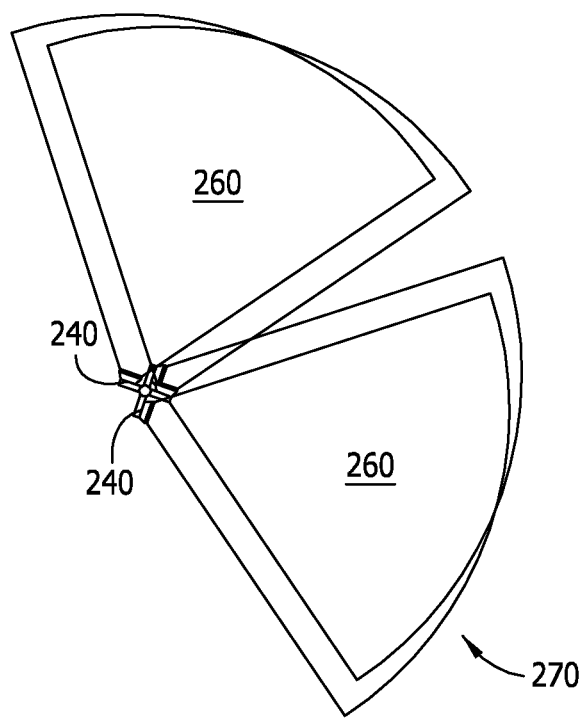
FIG. 6 is a top view of an exemplary light tower that may be used with the lighting system shown in FIG. 3.

FIG. 6, for example, is a top view of light tower 230 including a plurality of poles (not shown) that extend along the vertical axis of light tower 230 and that are arranged in a telescopic configuration. In the exemplary embodiment, each of the plurality of poles is independently rotatable about the vertical axis to direct a respective light beam 260 towards a desired area. Accordingly, in the exemplary embodiment, light tower 230 may project light beams 260 in various directions including a common direction (i.e., converging beams) and separate directions (i.e., diverging beams). Light tower 230 and/or tower lights 240 may be adjustable in any direction and/or have any configuration that enables lighting system 210 to function as described herein.

During operation, in the exemplary embodiment, a control mechanism and/or computing system 500 (shown in FIG. 7) receives a desired position and/or a desired direction (e.g., a point of interest 270) from user input, for example, or from sensor data, for another example, and deploys anything in its control to automatically adjust body-mounted light 220, light tower 230, and/or tower lights 240 towards the desired position and/or the desired direction. Accordingly, point of interest 270 is illuminated based on any arrangement of programming, sensors, and/or user input.

For example, in the exemplary embodiment, a touch screen presents an image of vehicle 200 to a user, and the touch screen receives user input associated with point of interest 270. In the exemplary embodiment, computer system 500 dynamically calculates and/or determines which lights 220 and/or 240 to activate and how to position light tower 230 such that light beams 250 and/or 260 may be projected towards a desired direction at a desired distance. In at least some embodiments, computer system 500 automatically adjusts a beam spread of light beam 250 and/or 260.

In at least some embodiments, at least one sensor enables at least one point of interest 270 to be detected and/or determined based on a location of an accident, a fire, a nozzle, and/or a crew member. Sensors may include, without limitation, a light sensor, a proximity sensor, a camera, a global positioning system sensor, an infrared sensor, and/or a radio receiver. For example, in one implementation, at least one sensor is configured and/or oriented to detect a marker or identifier coupled to a nozzle and/or a crew member. In such an embodiment, the control mechanism (shown in FIG. 7) is configured to automatically adjust body-mounted light 220, light tower 230, and/or tower lights 240 towards the detected marker. Alternatively, sensors may be any sensor located in any position that enables lighting system 210 to function as described herein.

In at least some embodiments, point of interest 270 may be determined based on a scene type (e.g., a type of emergency) determined and/or identified by a dispatch center and/or computer system 500. In such embodiments, body-mounted light 220, light tower 230, and/or tower lights 240 may be automatically adjusted in the desired direction and/or orientation based on preset light patterns associated with the scene type. Moreover, in such embodiments, computing system 500 and/or the sensors may be programmed to search for and/or identify predetermined items associated with the scene type. For example, in a fire-related emergency, a camera and/or an infrared sensor could locate a fire and/or heat to facilitate automatically projecting light beams 250 and/or 260 towards the fire and/or heat. In at least some embodiments, computer system 500 automatically adjusts a beam spread of light beam 250 and/or 260.

In some embodiments, computer system 500 is programmed to automatically adjust body-mounted light 220, light tower 230, and/or tower lights 240 based on a plurality of points of interest 270. For example, in one implementation, a first point of interest 270 is determined based on user input, a second point of interest 270 is determined based on a location of an accident, a fire, a nozzle, and/or a crew member, and a third point of interest 270 is determined based on a scene type. Accordingly, in the exemplary embodiment, body-mounted light 220 and tower lights 240 are automatically orientable to project light beams 250 and 260 towards a plurality of desired directions and/or desired positions.

In one implementation, computer system 500 may automatically adjust a beam spread of light beam 250 and/or 260 to have a wide beam spread until light beam 250 and/or 260 is projected generally towards point of interest 270, and then adjust the beam spread of light beam 250 and/or 260 to have a narrow beam spread to focus a user's attention on point of interest 270. In another implementation, the beam spread of light beam 250 and/or 260 may be adjusted to have a wide beam spread to provide a wide range of light around point of interest 270.

Figure 7:
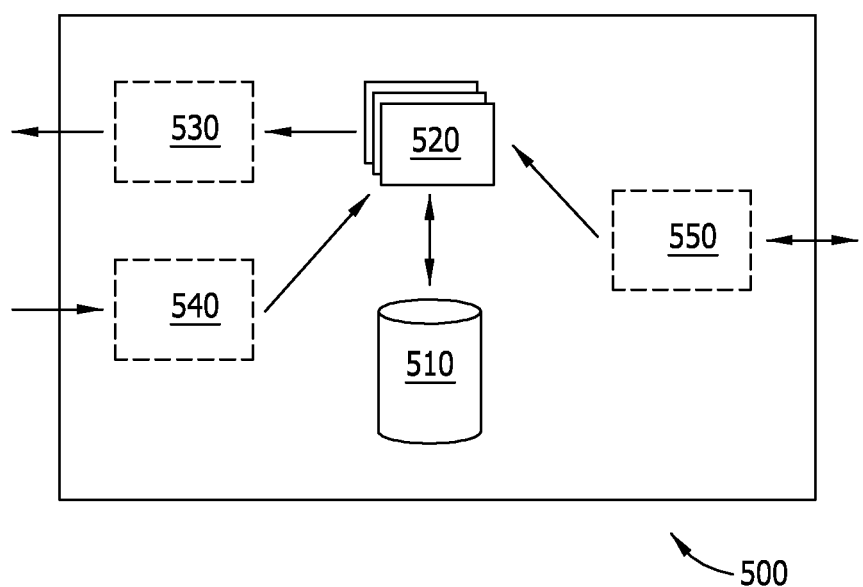
FIG. 7 is a schematic illustration of a computer system that may be used with the lighting system shown in FIG. 3.

FIG. 7 is a schematic illustration of computing system 500. In the exemplary embodiment, computing system 500 is coupled to the sensors, body-mounted light 220, light tower 230 and/or tower lights 240 to enable body-mounted light 220, light tower 230 and/or tower lights 240 to be automatically adjusted. In the exemplary embodiment, computing system 500 includes a memory device 510 and a processor 520 coupled to memory device 510 for use in executing instructions. More specifically, in the exemplary embodiment, computing system 500 is configurable to perform one or more operations described herein by programming memory device 510 and/or processor 520. For example, processor 520 may be programmed by encoding an operation as one or more executable instructions and by providing the executable instructions in memory device 510.

Processor 520 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 510 includes one or more devices (not shown) that enable information such as executable instructions and/or other data to be selectively stored and retrieved. In the exemplary embodiment, such data may include, but is not limited to, sensor data, lighting properties, operational data, and/or control algorithms. In the exemplary embodiment, computing system 500 receives sensor data and/or user input and is programmed to automatically adjust body-mounted light 220, light tower 230 and/or tower lights 240 based on the sensor data and/or user input. Computing system 500 may be configured to use any algorithm and/or method that enable the methods and systems to function as described herein. Memory device 510 may also include one or more computer readable media, such as, without limitation, dynamic random access memory (DRAM), static random access memory (SRAM), a solid state disk, and/or a hard disk.

In the exemplary embodiment, computing system 500 includes a presentation interface 530 that is coupled to processor 520 for use in presenting information to a user. For example, presentation interface 530 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 530 includes one or more display devices.

Computing system 500, in the exemplary embodiment, includes an input interface 540 for receiving input from the user. In the exemplary embodiment, input interface 540 receives information suitable for use with the methods described herein. For example, in the exemplary embodiment, the user may input an instruction for adjusting body-mounted light 220, light tower 230 and/or tower lights 240 or input point of interest 270. Input interface 540 is coupled to processor 520 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 530 and as input interface 540.

In the exemplary embodiment, computing system 500 includes a communication interface 550 that is coupled to processor 520. In the exemplary embodiment, communication interface 550 communicates with at least one remote device. For example, communication interface 550 may use, without limitation, a wired network adapter, a wireless network adapter, and/or a mobile telecommunications adapter. A network (not shown) used to couple computing system 500 to the remote device may include, without limitation, the Internet, a local area network (LAN), a wide area network (WAN), a wireless LAN (WLAN), a mesh network, and/or a virtual private network (VPN) or other suitable communication means.

The methods and apparatus described herein relate to lighting systems and, more particularly, to lighting systems for use with emergency vehicles. The lighting system described herein facilitates reducing time and/or effort associated with deploying a lighting system. Accordingly, the lighting system described herein enables an emergency responder to focus his or her attention or efforts to other tasks on the scene.

Exemplary embodiments of lighting systems are described above in detail. The methods and systems are not limited to the specific embodiments described herein, but rather, operations of the methods and components of the systems may be utilized independently and separately from other operations and/or components described herein. For example, the methods and apparatus described herein may have other industrial and/or consumer applications and are not limited to practice with medical devices as described herein. Rather, one or more embodiments may be implemented and utilized in connection with other industries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lighting system for a vehicle including a body having a vertical side wall that at least partially defines an outer periphery of the vehicle, the lighting system comprising:
a plurality of lights coupled to the body, wherein each of the plurality of lights is adjustable to project a light beam, the plurality of lights including at least a first light mounted on the vertical side wall, the first light selectively positionable between a stowed position, in which the first light is substantially flush with the vertical side wall and oriented to project a light beam in a first direction away from the vehicle, and a deployed position, in which the first light is spaced from the vehicle body and positioned outward from the vertical side wall, wherein the first light is selectively rotatable to enable the first light to project a light beam away from the vehicle in a second direction different from the first direction when in the deployed position.

2. A lighting system in accordance with claim 1, wherein the plurality of lights comprises at least a second light that is selectively positionable between a stowed position, in which the second light is substantially flush with the body wherein the second light is oriented to project a light beam in a third direction away from the vehicle, and a deployed position in which the second light is spaced outward from the vehicle body, the second light being selectively positionable between the stowed position and the deployed position independently of the first light.

3. A lighting system in accordance with claim 1 further comprising a control mechanism communicatively coupled to the plurality of lights, wherein the control mechanism is configured to automatically adjust a spread of the light beam.

4. A lighting system in accordance with claim 1, wherein the first light is mounted on the vertical side wall via a hinge, the first light being selectively rotatable about a vertical axis of the hinge.

5. A lighting system in accordance with claim 1, wherein the first light comprises a pole directly coupled to the vehicle body, the pole having a telescopic configuration that enables a length of the pole to be selectively adjusted to a desired length.

6. A lighting system in accordance with claim 1, wherein the second direction is substantially perpendicular to the first direction.

7. A lighting system in accordance with claim 1 further comprising a tower assembly comprising a tower coupled to the vehicle body, wherein a second light of the plurality of lights is coupled to the tower, and the tower is automatically movable between a stowed position of the tower assembly and a deployed position.

8. A lighting system in accordance with claim 7 further comprising a sensor oriented to detect an object adjacent the tower assembly and a control mechanism communicatively coupled to the sensor and the plurality of lights, wherein the control mechanism is configured to determine whether the tower is clear to move between the stowed position and the deployed position.

9. A lighting system in accordance with claim 1, wherein the first light is selectively rotatable in the deployed position about a first axis of rotation to project the light beam away from the vehicle in the second direction, wherein the first light is selectively rotatable about a second axis of rotation to project the light beam in a third direction.

10. A lighting system in accordance with claim 1, wherein the body defines a cavity in the vertical side wall, and wherein the first light is positioned within the cavity in the stowed position.

11. A vehicle comprising:
a body comprising a vertical side wall that at least partially defines an outer periphery of the vehicle; and
a plurality of lights coupled to the body, wherein each of the plurality of lights is adjustable to project a light beam, the plurality of lights including at least a first light mounted on the vertical side wall, the first light selectively positionable between a stowed position, in which the first light is substantially flush with the vertical side wall and is oriented to project a light beam in a first direction away from the vehicle, and a deployed position, in which the first light is spaced from the vehicle body and is positioned outward from the vertical side wall, wherein the first light is selectively rotatable to enable the first light to project a light beam away from the vehicle in a second direction different from the first direction when in the deployed position.

12. A vehicle in accordance with claim 11, wherein the plurality of lights comprises at least a second light that is selectively positionable between a stowed position, in which the second light is substantially flush with the body and is oriented to project a light beam in a third direction away from the vehicle, and a deployed position in which the second light is positioned outward from the vehicle body, wherein the second light is selectively positionable between the stowed position and the deployed position independently of the first light.

13. A vehicle in accordance with claim 11 further comprising a control mechanism communicatively coupled to the plurality of lights, wherein the control mechanism is configured to automatically adjust a spread of the light beam.

14. A vehicle in accordance with claim 11, wherein the first light is mounted on the vertical side wall via a hinge, the first light being selectively rotatable about a vertical axis of the hinge.

15. A vehicle in accordance with claim 11, wherein the first light comprises a pole directly coupled to the body, the pole having a telescopic configuration that enables a length of the pole to be selectively adjusted to a desired length.

16. A vehicle in accordance with claim 11, wherein the second direction is substantially perpendicular to the first direction.

17. A vehicle in accordance with claim 11 further comprising a tower assembly comprising a tower coupled to the body, wherein a second light of the plurality of lights is coupled to the tower, and the tower is automatically movable between a stowed position of the tower assembly and a deployed position.

18. A vehicle in accordance with claim 17 further comprising a sensor oriented to detect an object adjacent the tower assembly and a control mechanism communicatively coupled to the sensor and the plurality of lights, wherein the control mechanism is configured to determine whether the tower is clear to move between the stowed position and the deployed position.

19. A vehicle in accordance with claim 11, wherein the body defines a cavity in the vertical side wall, and wherein the first light is positioned within the cavity in the stowed position.

20. A vehicle in accordance with claim 11, wherein the body comprises a front end and a rear end opposite the front end, wherein the vertical side wall extends between the front end and rear end.

* * * * *